US012762977B2

(12) United States Patent
Han et al.

(10) Patent No.: US 12,762,977 B2
(45) Date of Patent: Oct. 13, 2026

(54) DISPLAY DEVICE

(71) Applicant: Samsung Display Co., LTD., Yongin-si (KR)

(72) Inventors: Soo Yeon Han, Gwacheon-si (KR); Chel Gou Lim, Suwon-si (KR); Jeongjin Park, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 446 days.

(21) Appl. No.: 18/105,762

(22) Filed: Feb. 3, 2023

(65) Prior Publication Data

US 2023/0252915 A1 Aug. 10, 2023

(30) Foreign Application Priority Data

Feb. 7, 2022 (KR) ........................ 10-2022-0015695

(51) Int. Cl.
*G09F 9/30* (2006.01)

(52) U.S. Cl.
CPC .................................... *G09F 9/301* (2013.01)

(58) Field of Classification Search
CPC ............. G02F 1/33305; G02F 1/33308; G02F 1/33528; G02F 1/3452; G02F 1/33314; G09F 9/00; G09F 9/30; G09F 9/301; G06F 1/1652; G06F 1/656
USPC ......... 361/749–750, 795, 803; 174/254–260; 349/149–200
See application file for complete search history.

(56) References Cited

U.S. PATENT DOCUMENTS

| | | | | |
|---|---|---|---|---|
| 10,516,118 B2 | 12/2019 | Kuwabara | | |
| 10,534,402 B1 * | 1/2020 | Kim | H05K 1/118 | |
| 10,998,512 B2 | 5/2021 | Kuwabara | | |
| 11,401,210 B2 | 8/2022 | Dejneka et al. | | |
| 2001/0017731 A1 * | 8/2001 | Smith | G02B 5/124 | 359/530 |
| 2004/0145689 A1 * | 7/2004 | Sugiura | G02F 1/133553 | 349/113 |
| 2007/0046142 A1 | 3/2007 | Obara et al. | | |
| 2007/0091232 A1 * | 4/2007 | Kim | G02F 1/133305 | 349/113 |
| 2018/0061905 A1 * | 3/2018 | Choi | H10K 59/35 | |
| 2018/0122830 A1 * | 5/2018 | Kachatryan | B32B 15/08 | |
| 2019/0096975 A1 * | 3/2019 | Park | H10H 20/854 | |
| 2020/0103741 A1 * | 4/2020 | Song | H04N 9/3173 | |
| 2020/0381659 A1 * | 12/2020 | Kim | H10K 77/111 | |
| 2021/0217976 A1 * | 7/2021 | Min | G09F 9/301 | |
| 2021/0280641 A1 * | 9/2021 | Bang | H10K 50/844 | |
| 2021/0282279 A1 * | 9/2021 | Min | B32B 27/281 | |
| 2021/0319725 A1 * | 10/2021 | Zhu | H10K 59/38 | |

(Continued)

FOREIGN PATENT DOCUMENTS

| | | | |
|---|---|---|---|
| CN | 209447443 U | 9/2019 | |
| JP | 20070897143 A | 4/2007 | |

(Continued)

*Primary Examiner* — Tuan T Dinh
(74) *Attorney, Agent, or Firm* — CANTOR COLBURN LLP

(57) ABSTRACT

The disclosure includes a display panel, and a support layer positioned on the display panel. The support layer includes a metal layer, and an elastic layer positioned on opposing sides of the metal layer, and the metal layer has an alternate structure in which grooves are alternately defined on the opposing sides thereof.

21 Claims, 31 Drawing Sheets

(56) References Cited

U.S. PATENT DOCUMENTS

| | | | | |
|---|---|---|---|---|
| 2022/0312602 | A1* | 9/2022 | Wang ................ | G02F 1/133305 |
| 2022/0346249 | A1 | 10/2022 | Ahn et al. | |
| 2022/0356113 | A1 | 11/2022 | Dejneka et al. | |

FOREIGN PATENT DOCUMENTS

| | | | |
|---|---|---|---|
| JP | 2017138570 | A | 8/2017 |
| JP | 2020536833 | A | 12/2020 |
| KR | 1020170124120 | | 11/2017 |
| KR | 101834793 | | 3/2018 |
| KR | 1020180056626 | | 5/2018 |
| KR | 1020190023919 | | 3/2019 |
| KR | 1020210078242 | | 6/2021 |
| KR | 1020220060605 | | 5/2022 |
| WO | 2021020605 | A1 | 2/2021 |

* cited by examiner

| Structures | Metal layer (SUS 301) equivalent physical property | |
|---|---|---|
| | Eeff (GPa) | Teff (μm) |
| Flat plate   | 189 | 100 |
| Lower pattern   | 223 | 118 |
| Slit pattern   | 12 | 6 |
| Groove   | 20 | 10 |

DISPLAY DEVICE

This application claims priority to Korean Patent Application No. 10-2022-0015695, filed on Feb. 7, 2022, and all the benefits accruing therefrom under 35 U.S.C. § 119, the content of which in its entirety is herein incorporated by reference.

BACKGROUND

(a) Field

The disclosure relates to display device, and more particularly, to a rollable display device having high flexibility and high rigidity.

(b) Description of the Related Art

With the recent development of display related technologies, display devices having a variable shape, such as foldable, rollable in a roll form, and stretchable like a rubber band, have been researched and developed. The display device may be changed in various forms or shapes, and therefore may be both in a shape of a large-size display and shape of a small-size display for portability in use.

SUMMARY

In a flexible display device, which is foldable or rollable, when the display device is folded or rolled, stress is applied to constituent elements of the display device. The stress may cause damage to the display panel and may deteriorate displaying quality.

Embodiments of the invention provide a rollable display device with high flexibility and high rigidity.

An embodiment of the invention provides a display device including a display panel and a support layer positioned on the display panel, where the support layer includes a metal layer, and an elastic layer positioned on opposing sides of the metal layer, and the metal layer has an alternate structure in which grooves are alternately defined on the opposing sides thereof.

In an embodiment, the metal layer may include at least one selected from aluminum, titanium, and stainless steel.

In an embodiment, a thickness of the metal layer may be in a range of about 0.5 millimeter (mm) to about 2 mm.

In an embodiment, the elastic layer may fill the grooves of the metal layer.

In an embodiment, an elasticity coefficient of the elastic layer may be in a range of about 1 kilopascal (KPa) to about 10 gigapascal (GA).

In an embodiment, the elastic layer may include an elastomer.

In an embodiment, a thickness of the support layer may be in a range of about 10 micrometers (μm) to about 10 mm.

In an embodiment, a width of each of the grooves may be one to ten times a thickness of the metal layer.

In an embodiment, a height of each of the grooves may be one to ten times a thickness of the metal layer.

In an embodiment, a predetermined region of the metal layer may not be covered by the elastic layer.

In an embodiment, the support layer may further include a flat metal layer positioned between the metal layer and the display panel.

In an embodiment, slits may be defined in the flat metal layer in one direction.

In an embodiment, the display device is rollable.

In an embodiment, a proceeding direction of each of the grooves may be perpendicular to a rolling direction of the display device.

In an embodiment, the grooves may be alternately positioned on the opposing sides of the metal layer in a rolling direction of the display device.

In an embodiment, the groove may have a quadrangular shape with a curved corner in a cross-section.

In an embodiment, the groove may have a triangular shape with a curved corner in a cross-section.

In an embodiment, the groove may have an oval shape in a cross-section.

In an embodiment, the groove may have a circular shape in a cross-section.

In an embodiment, a valid thickness of the metal layer for a neutral plane may be equal to or less than about 10% of an actual thickness of the metal layer.

In an embodiment, a neutral plane of the display device may be positioned in the display panel.

According to the embodiments, the rollable display device may have both high flexibility and high rigidity.

DETAILED DESCRIPTION

Figure 1:
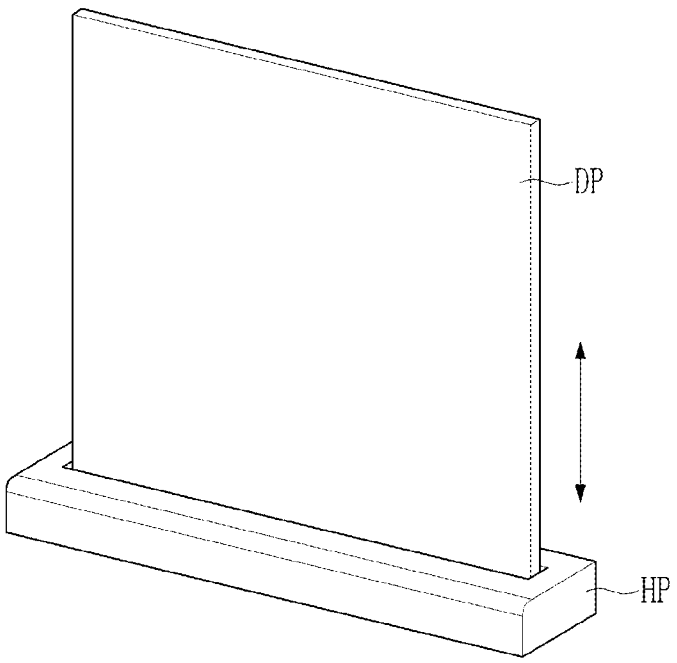
FIG. 1 shows a perspective view of a display device according to an embodiment.

The invention now will be described more fully hereinafter with reference to the accompanying drawings, in which various embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Parts that are irrelevant to the description will be omitted to clearly describe embodiments of the invention, and the same elements will be designated by the same reference numerals throughout the specification.

The size and thickness of each configuration shown in the drawings are arbitrarily shown for better understanding and ease of description, but the invention is not limited thereto. In the drawings, the thickness of layers, films, panels, regions, etc., are enlarged for clarity. For ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

The phrase "in a plan view" means viewing an object portion from the top, and the phrase "in a cross-sectional view" means viewing a cross-section of which the object portion is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Embodiments of the invention will hereinafter be described in detail with reference to the accompanying drawings.

FIG. 1 shows a perspective view of a display device according to an embodiment. Referring to FIG. 1, an embodiment of the display device includes a display unit DP and a receiver HP. The display unit DP may include, as a configuration for displaying images to a user, a display element, and a circuit and wires for driving the display element. In an embodiment, as shown in FIG. 1, the display device may be a rollable display device, and the display unit DP may be rolled or unfolded. The receiver HP is a housing for receiving the display unit DP. The display unit DP may be rolled to be received in the receiver HP, or may be unfolded to display images outside the receiver HP.

Figure 2:
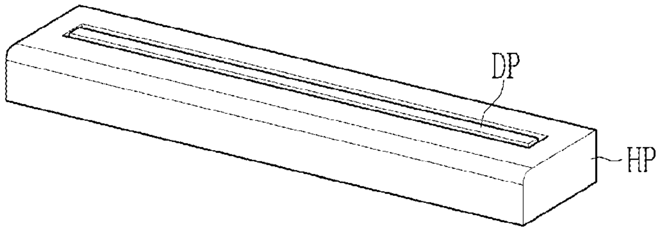
FIG. 2 shows a state in which a display unit is rolled and received into a receiver.
Figure 3:
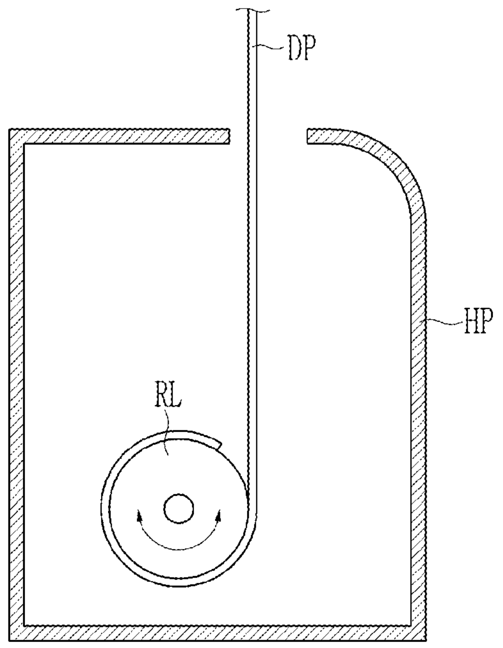
FIG. 3 shows a process in which a display unit is rolled or unrolled by a roller positioned in a receiver.

FIG. 1 shows an embodiment of the display device in a state where the display unit DP is unfolded. FIG. 2 shows an embodiment of the display device in a state where the display unit DP is rolled and received into the receiver HP. FIG. 3 shows a process in which a display unit DP is rolled or untangled by a roller RL positioned in a receiver HP. As shown in FIG. 3, the roller RL is positioned in the receiver HP, and the display unit DP may be wound on the roller RL or may be unwound therefrom and may be disposed on appropriate positions depending on use conditions. That is, when the display unit DP is completely wound on the roller RL, the display unit DP may be received in the receiver HP, as shown in FIG. 2. When the display unit DP is completely unwound from the roller RL, the display unit DP may be positioned outside the receiver HP and may display images, as shown in FIG. 1.

Figure 4:
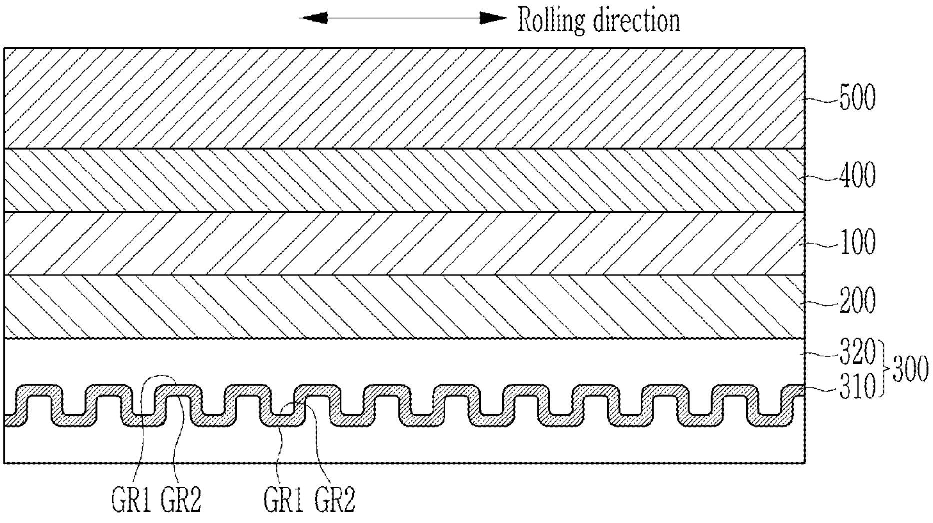
FIG. 4 shows a cross-sectional view of a display unit according to an embodiment.

FIG. 4 shows a cross-sectional view of a display unit DP according to an embodiment. Referring to FIG. 4, an embodiment of the display unit DP may include a display panel 100, a cushion layer 200, a support layer 300, an optical layer 400, and a window 500. Although not shown, adhesive layers may be positioned among the display panel 100, the cushion layer 200, the support layer 300, the optical layer 400, and the window 500 to be bonded to each other. The support layer 300 may include a metal layer 310 and an elastic layer 320 contacting the metal layer 310. The elastic layer 320 may contact one side or respective sides of the metal layer 310. The respective sides of the metal layer 310 includes a front side and a rear side of the metal layer 310. Opposing sides of the metal layer 310 directly contacting the elastic layer 320 correspond to the front side and the rear side, and the opposing sides will be referred to as the respective sides of the metal layer 310.

In embodiments, the elastic layer 320 may surround the entire metal layer 310 or part of the metal layer 310. In an embodiment, for example, the front side and the rear side of the metal layer 310 may be covered by the elastic layer 320, and respective lateral sides of the metal layer 310 may not be covered by the elastic layer 320.

The metal layer 310 may, as shown in FIG. 4, have an alternate structure in which grooves GR are alternately positioned on the respective sides, and a shape of the support layer 300 will be described later in greater detail.

The display panel 100 may include a plurality of transistors and a light-emitting device connected thereto. The cushion layer 200 may include silicon or urethane, and is not limited thereto. The Young's modulus of the cushion layer 200 may be in a range of about 1 kilopascals (KPa) to about 1000 KPa. The optical layer 400 may perform a function for reflecting external light, and may include a polarization layer or a color filter layer. The optical layer 400 may be omitted, depending on embodiments. The window layer 500 may include glass or polymers. The polymers may include a polyimide, for example, and are not limited thereto. A hard coating layer (not shown) may be further included on an upper side of the window layer 500. FIG. 4 shows a structure of an embodiment of the display device, but the invention is not limited thereto. Alternatively, the display device may further include other layers, or some of the layers shown in FIG. 4 may be omitted.

As shown in FIG. 4, the display unit DP may be rolled in one direction. The rolling direction may be perpendicular to the direction in which the respective grooves GR are formed. That is, the grooves GR may be alternately positioned on the respective sides of the metal layer 310 in the rolling direction.

A structure of the support layer 300 according to an embodiment will hereinafter be described in detail.

Figure 5:
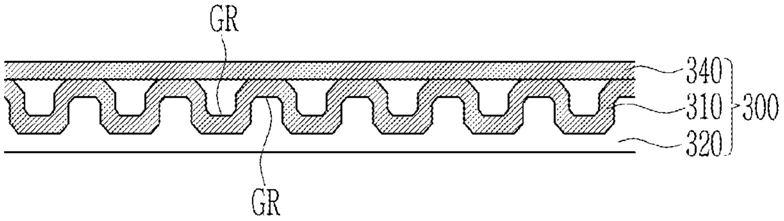
FIG. 5 shows a support layer according to an embodiment.

FIG. 5 shows a support layer 300 according to an embodiment. Referring to FIG. 5, an embodiment of the support layer 300 may include a metal layer 310 and an elastic layer 320 positioned on respective sides of the metal layer 310. The metal layer 310 may be positioned in a center of the support layer 300, or may lean in one direction from the center depending on embodiments. FIG. 5 shows a configuration in which the metal layer 310 is positioned in the center of the support layer 300, but not being limited thereto.

The metal layer may, as shown in FIG. 5, have an alternate shape including grooves GR alternately positioned on respective sides. The groove GR may be formed by bending the metal layer 310, and is not limited thereto. In an embodiment, for example, the groove GR may be formed by etching the metal layer 310. In an alternative embodiment, the groove GR may be formed by rolling the metal layer 310 with a roller.

As shown in FIG. 5, the groove GR may have a quadrangle-like shape. The quadrangle-like shape represents a quadrangle with at least one curved corner. An outer side GR1 of the groove GR may have a curved shape without a sharp corner or angle. If the groove GR includes a sharp or angled corner, stress may be focused on the corner. In an embodiment, as the outer side GR1 of the groove GR has a curved shape, the stress on the side contacting the elastic layer 320 may be efficiently dispersed.

An inner side GR2 of the groove GR is shown to have a shape including no sharp corner or angle. The outer side GR1 and the inner side GR2 of the groove GR may include no sharp corner or angle as described. However, according to an embodiment, the outer side GR1 of the groove GR may be a curved surface and the inner side GR2 of the groove GR may be an angulated surface. In such an embodiment, since the outer side GR1 on which the groove GR contacts the elastic layer 320 has a high influence on stress dispersion, the outer side GR1 has a curved surface to efficiently disperse the stress.

The outer side GR1 represents a portion positioned on an outside of one convex groove having a greater curvature radius, and the inner side GR2 represents a portion positioned on an inside of one convex groove having a lesser curvature radius. As the convex and concave grooves are repeated, the outer sides GR1 and the inner sides GR2 are alternately positioned on the metal layer 310.

Figure 6:
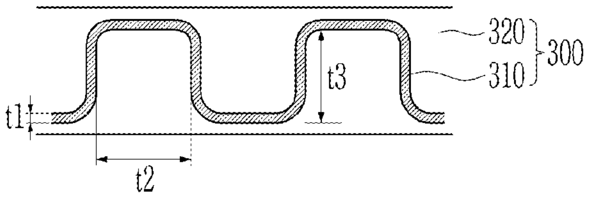
FIG. 6 shows respective measurements of a metal layer.

FIG. 6 shows respective measurements of a metal layer 310. Referring to FIG. 6, a thickness t1 of the metal layer 310 may be in a range of about 0.5 millimeters (mm) to about 2 mm. The thickness t1 is in a numerical range for preventing the support layer 300 from drooping, and minimizing a variation of a neutral plane, which will be described later in greater detail with reference to FIG. 7 and FIG. 8. The thickness t1 indicates the thickness of the metal layer 310 at a lowest end or a highest end of the groove GR, as shown in FIG. 6.

A width t2 and a height t3 of the groove GR of the metal layer 310 may be appropriately adjusted according to the curvature radius of the display device. The width t2 and the height t3 may be one to ten times the thickness t1 of the metal layer 310. If the width t2 and the height t3 are less than the thickness t1 of the metal layer 310, an area of the groove GR may be very small, and the stress may be insufficiently dispersed. If the width t2 and the height t3 are greater than ten times the thickness t1 of the metal layer 310, the size of the groove GR may be excessively increased and the display panel 100 may be insufficiently supported.

However, the numerical range described above is merely an example, and regarding the metal layer 310. In an embodiment, the width and the height of the groove GR may be appropriately adjusted according to the curvature radius of the display device in a way such that the stress is uniformly dispersed through the groove GR.

A material of the metal layer 310 may include, for example, at least one selected from aluminum, titanium, and stainless steel.

The elastic layer 320 may include a highly elastic material with great elasticity restoring force, for example, it may include an elastomer. The Young's modulus of the elastic layer 320 may be in a range of about 1 KPa to about 10 gigapascals (GPa). The elastic layer 320 may increase flexibility of the support layer 300, and may fill an empty space between the grooves GR of the metal layer 310 so that the support layer 300 may stably support the display panel 100.

In an embodiment, as described above, the metal layer 310 includes the grooves GR that are alternately positioned on the respective sides thereof, such that the display device may have high flexibility and high rigidity. Hence, the metal layer 310 may function as a supporting unit for the flexible display device such as the rollable display device. The rollable display device is desired to have the high-flexibility characteristic for receiving a display panel thereof in a rolled state and a high-rigidity characteristic for stable support of the structure in a unfolded state when used. The flexibility and the rigidity are trade-off characteristics so it may not be easy to satisfy the characteristics at the same time. In an embodiment of the invention, the display device includes the metal layer 310 in which the support layer 300 includes grooves GR alternately positioned on the respective sides, and the elastic layer 320 surrounding the metal layer 310, thereby satisfying both the high flexibility and the high rigidity. In such an embodiment, the display device may have rigidity by the metal layer 310 and may have flexibility by the alternate shape of the metal layer 310. The groove GR of the metal layer 310 allows the display device to be smoothly rolled well, and the metal layer 310 has rigidity so the support layer 300 may stably support the structure of the display device when used. The metal layer 310 has the alternate shape in which the grooves GR are alternately positioned on the respective sides, so the equivalent thickness that influences the neutral plane of the display device may be significantly less than the actual thickness. Therefore, the metal layer 310 may be made thick to thus stably support the display device.

The thickness of the support layer 300 may be in a range of about 10 micrometers (μm) to about 10 millimeters (mm). If the thickness of the support layer 300 is less than 10 μm, the display panel 100 may be insufficiently supported. IF the thickness of the support layer 300 is greater than 10 mm, the entire thickness of the display device is increased so display device may not be efficiently rolled.

Figure 7:
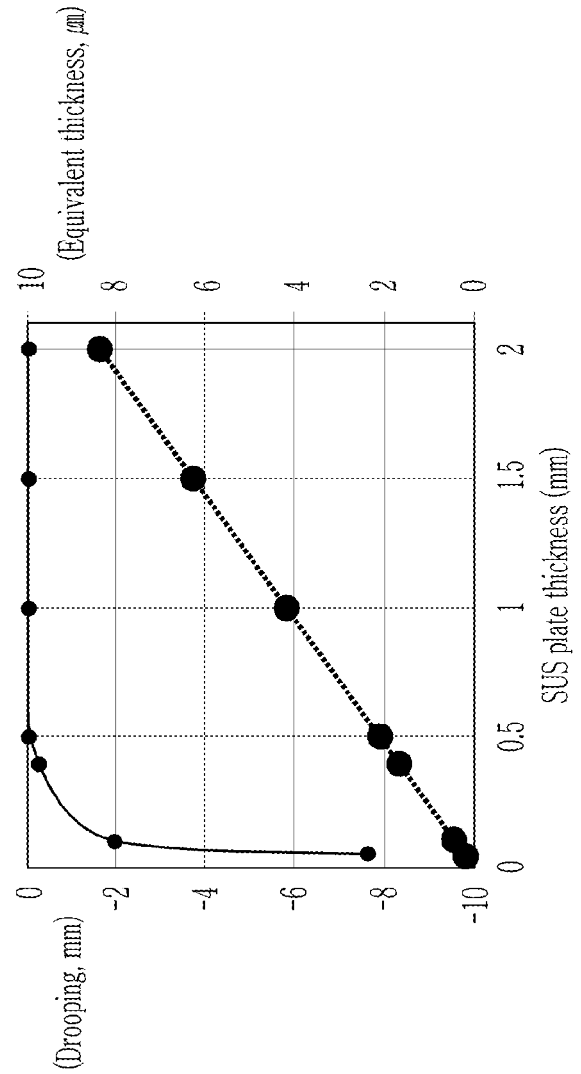
FIG. 7 shows equivalent thicknesses (right vertical axis, equivalent thickness, and μm) and drooping degrees (left vertical axis, drooping, and mm) with respect to thicknesses (horizontal axis, SUS Plate thickness, and mm) of a metal layer.

FIG. 7 shows equivalent thicknesses (right vertical axis, equivalent thickness, and μm) and drooping degrees (left vertical axis, drooping, and mm) with respect to thicknesses (horizontal axis, SUS Plate thickness, and mm) of a metal layer. Referring to FIG. 7, when the thickness of the metal layer 310 having the shape shown in FIG. 5 is 2 mm, it is found that the equivalent thickness substantially giving an influence to a physical property of the display device is about 8 μm. This signifies that the metal layer 310 with the thickness of 2 mm and having the same shape as that shown in FIG. 5 influences the neutral plane of the display device on a same level of the metal layer with the thickness of 8 μm. That is, it is found that a valid thickness of the metal layer for the neutral plane, that is, the valid thickness giving an influence to the neutral plane, is less than about 10% (e.g., about 1%) of the (actual) thickness of the metal layer.

The neutral plane indicates a plane in which a tensile stress is equal to a compressed stress so no stress is generated therein, and it is desirable for the neutral plane to be positioned on the display panel 100 in the display device. When the thickness of the support layer 300 positioned at a bottom of the display panel 100 increases, the neutral plane may move. Therefore, when the metal layer 310 is made thick, the neutral plane may move and this is undesirable. In an embodiment of the display device, the metal layer 310 has the alternate shape as shown in FIG. 5, and its valid thickness substantially giving an influence to the neutral plane is small as described above with reference to FIG. 7. Hence, with no concern about the movement of the neutral plane, the metal layer 310 may be made thick and the display device may be stably supported.

Referring to FIG. 7, when the thickness of the metal layer 310 is equal to or greater than 0.5 mm, it is found that the metal layer is not drooped but is stably maintained. Accordingly, in an embodiment, the thickness of the metal layer 310 may be set to be equal to or greater than about 0.5 mm.

Figure 8:
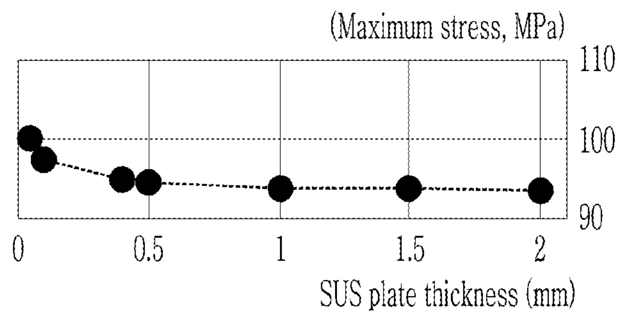
FIG. 8 shows maximum stresses with respect to thicknesses of a metal layer.

FIG. 8 shows maximum stresses with respect to thicknesses of a metal layer 310. FIG. 8 shows maximum stresses when a tensile stress is applied to the metal layer 310, in detail, showing the stress when a length is increased by 0.4% in comparison to the original length.

Referring to FIG. 8, it is found that the maximum stress is not much changed when the thickness of the metal layer 310 is increased. Therefore, it is found that the influence of the thickness of the metal layer 310 to the maximum stress is low, and when the metal layer 310 becomes thick at up to 2 mm, the maximum stress is not changed, and the metal layer 310 is bent well.

Figure 9:
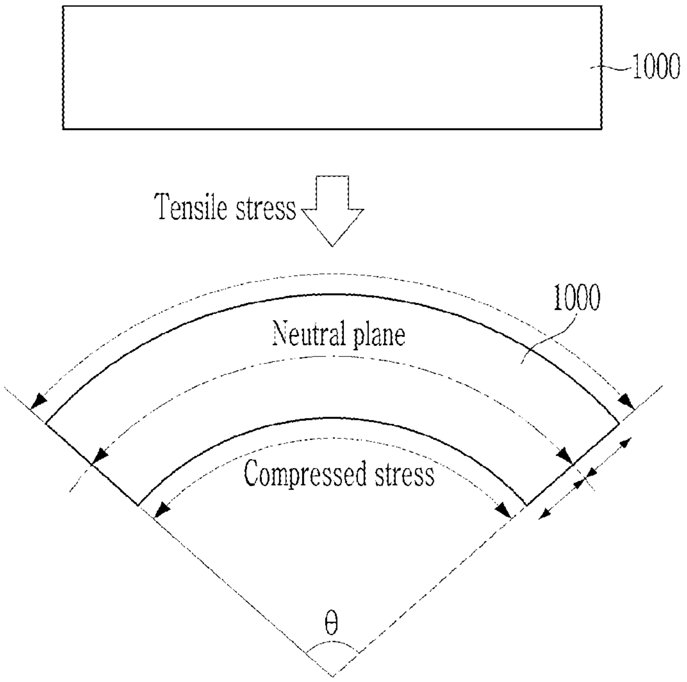
FIG. 9 shows a stress and a neutral plane generated in respective regions when a display device is bent.

FIG. 9 shows a stress and a neutral plane generated in respective regions when a display device 1000 is bent. As shown in FIG. 9, when the display device 1000 is bent, the tensile stress is generated on one side, and the compressed stress is generated on another side. The side on which the tensile stress is equal to the compressed stress and no stress is resultantly generated is referred to as the neutral plane. It is desirable for the neutral plane to be positioned on the display panel of the display device. When the neutral plane is positioned on the display panel, the elements positioned on the display panel may be effectively prevented from being damaged.

When the thickness of the support layer 300 is increased so that the display device may have high flexibility and high rigidity characteristics, the neutral plane moves. That is, the neutral plane positioned on the display panel 100 moves downward when the support layer 300 of the display panel 100 becomes thick, and in this case, a stress is applied to the display panel 100 and the elements may be damaged.

Figure 10:
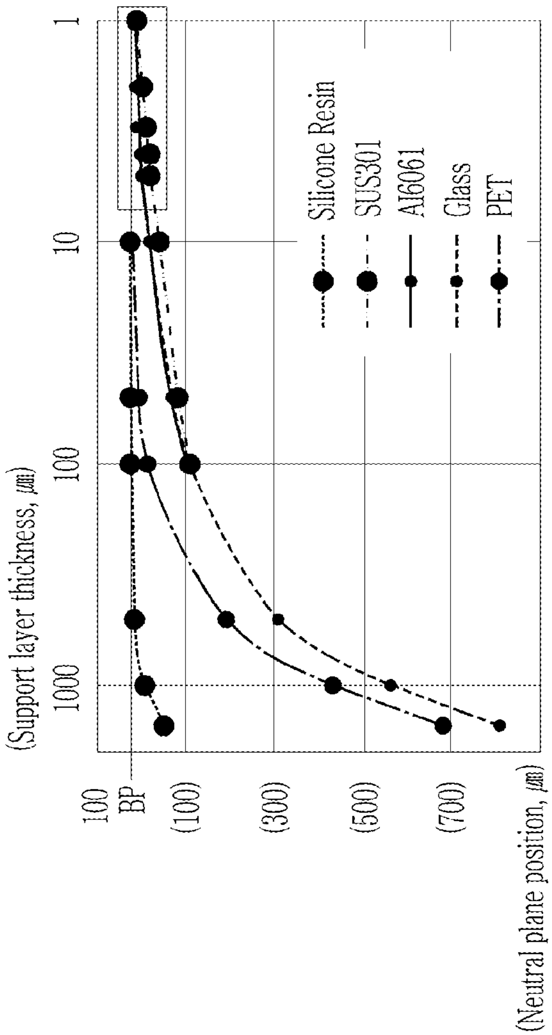
FIG. 10 shows calculation of changes of a neutral plane for respective thicknesses, regarding various materials of a support layer.

FIG. 10 shows calculation of changes of a neutral plane for respective thicknesses, regarding various materials of a support layer 300. A reference neutral plane BP is marked with a line.

The reference neutral plane BP indicates a position on which the neutral plane is desired to be provided in the display device. That is, it is desirable for the neutral plane to be in the position (i.e., the reference neutral plane, BP) shown in FIG. 10 in the display device to which the support layer is applied. The position of the reference neutral plane BP may be a region in which wires of the display device are disposed.

FIG. 10 shows measurements for a case in which respective materials are flat plates, and it is found, referring to FIG. 10, that changes of the neutral plane are not great when the thickness of SUS 301 that is one of the stainless steels becomes up to about 10 μm.

Figure 31:
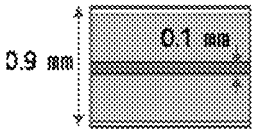
FIG. 31 shows measurements of valid thicknesses (Teff) and equivalent elastic coefficients (Eeff) for respective shapes by changing the shapes of the metal layer 310 with various thicknesses.
Figure 31:
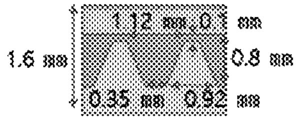
Figure 31:
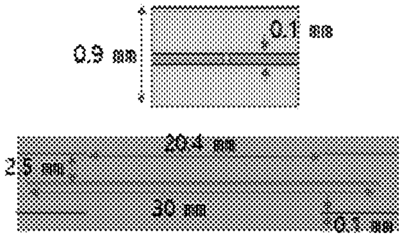
Figure 31:
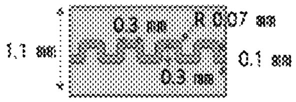

FIG. 31 expresses measurements of valid thicknesses (Teff) and equivalent elastic coefficients (Eeff) for respective shapes by changing the shapes of the metal layer 310 with various thicknesses. The metal layer 310 is made of stainless steel (SUS 301).

The valid thickness disclosed in FIG. 31 represents conversion of behavior of the metal layer 320 in a specific shape with a constant thickness into the thickness of the metal layer 320 in a flat plate shape. That is, the actual thickness substantially giving an influence to the neutral plane of the display device may be different according to the shape of the metal layer 320. The thickness substantially giving an influence to the neutral plane of the display device is converted into the thickness when the metal layer 320 is a flat plate.

Therefore, referring to FIG. 31, it is found that the flat metal layers with the thickness of 100 μm have the equivalent valid thickness of 100 μm.

It is found that the shape of the lower pattern with the numerical values expressed in FIG. 31 has the valid thickness of 118 μm.

It is found that the valid thickness is reduced to 6 μm when the metal layer is formed in a slit pattern with the numerical value expressed in FIG. 31, and the valid thickness is reduced to 10 μm when it is formed with an alternate structure including grooves GR as in an embodiment described herein.

That is, it is found that, when the metal layer 320 with the thickness of 100 μm is formed in a slit pattern, the metal layer 320 gives an influence to the neutral plane on a same level as the flat metal layer 320 with the thickness of 6 μm. Similarly, it is found that, when the metal layer 320 with the thickness of 100 μm is formed to have a groove GR shape, the metal layer 320 is found that this gives an influence to the neutral plane on the same level as the flat metal layer 320 with the thickness of 10 μm. Referring to FIG. 10, it is shown that the movement of the neutral plane BP is less than 100 μm when the thickness of the flat metal layer (SUS 301) is 10 μm. Therefore, as in an embodiment of the invention, when the alternate structure including grooves GR is formed with a metal with the actual thickness of 100 μm, the valid thickness is 10 μm as can be found from FIG. 31, and when the thickness is 10 μm, the movement of the neutral plane is very small as shown in FIG. 10. It is resultantly found that the display device may be stably supported without a substantially movement (or change) of the neutral plane.

Referring to FIG. 31, equivalent elasticity coefficients (Eeff) for respective shapes are expressed. It is found from the alternate structure including grooves GR according to an embodiment that, when the thickness is 0.1 mm, a modulus is 20 GPa which is a low level.

Referring to FIG. 31, the slit pattern also has a low valid thickness and a low equivalent elasticity coefficient. In the case of the slit pattern, the stress is concentrated on the slit portion so the slit portion may be destroyed with a high possibility, which is undesirable. The concentration of the stress is shown in FIG. 11, which will be described in detail with reference to FIG. 11.

In an embodiment, the metal layer 310 has the alternate structure including grooves GR, such that the stress is uniformly dispersed at the time of tensioning, and the metal layer may be stably rolled without destroying the structure.

Figure 11:
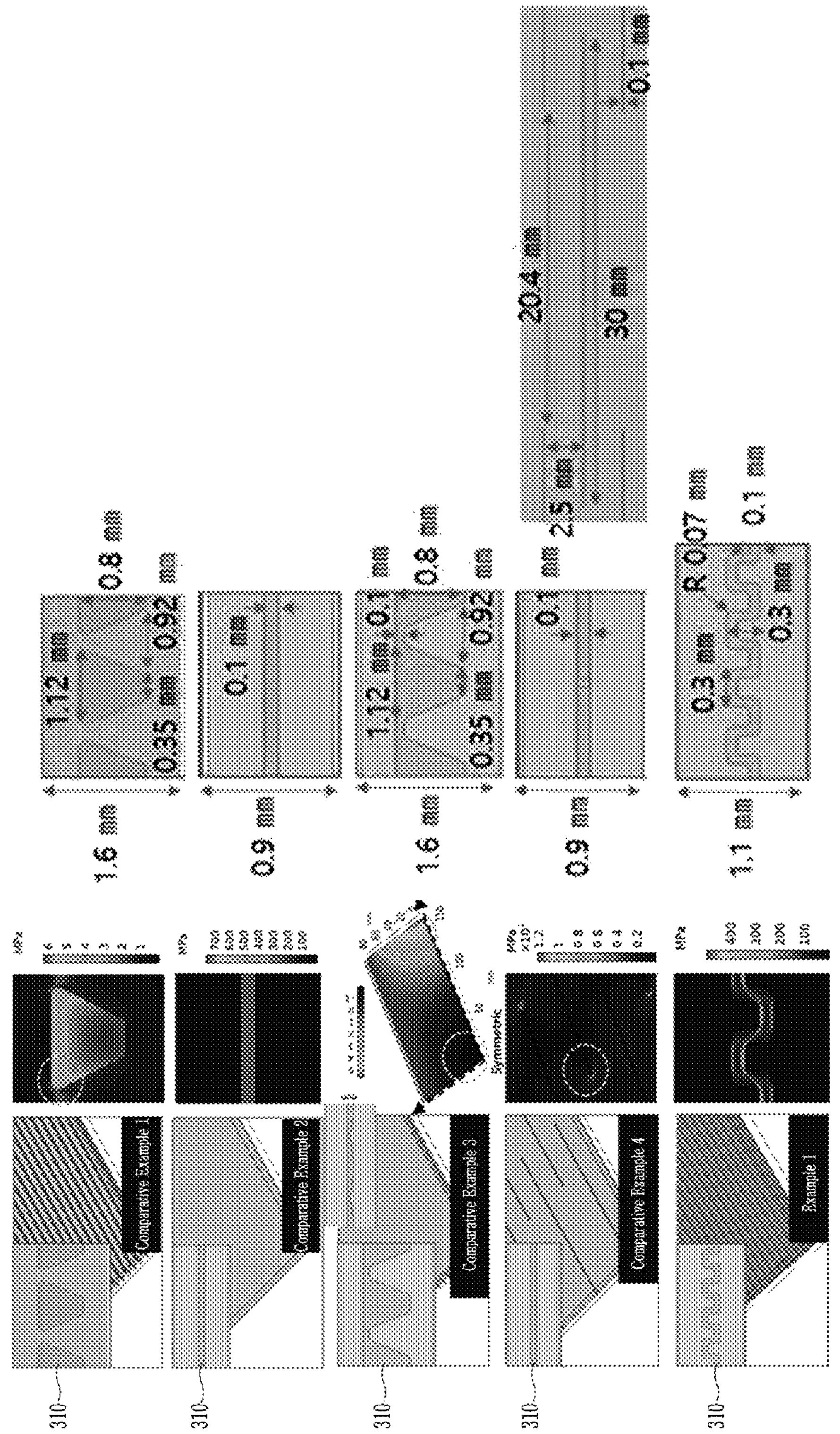
FIG. 11 shows stresses applied to respective metal layers when the metal layers have various shapes (Comparative Examples 1 to 4 and Embodiment 1).

FIG. 11 shows stresses applied to respective metal layers 310 when the metal layers have various shapes (Comparative Examples 1 to 4 and Embodiment 1). FIG. 11 shows various shapes and detailed numerical values of the metal layer 310.

Referring to FIG. 11, when the metal layer 310 has a segmented structure as in Comparative Example 1, the stress may be concentrated around the edge of the metal layer 310. When the metal layer 310 has a thin plate shape as in Comparative Example 2, much stress is applied to the metal layer 310. Comparative Example 3 shows a structure in which a lower portion of the metal layer 310 is patterned, and in this case, as shown in FIG. 11, the edge may be deformed, such as bent. Comparative Example 4 shows that the metal layer 310 has a patterned slit shape, and in this case, as shown in FIG. 11, the stress may be concentrated around the edge of the slit. Therefore, when the valid thickness and the equivalent elasticity coefficient of the metal layer in a slit shape are found to be lower than those of the metal layer in a groove shape according to a test result of FIG. 31, the metal layer in a slit shape is inappropriate in use because of a stress concentration phenomenon.

In Embodiment 1, the metal layer 310 has an alternate structure including grooves GR. Referring to FIG. 11, it is found that the metal layer 310 is uniformly positioned with the stress concentrated region.

In the case of Comparative Examples 1 to 4, the stress is concentrated on a predetermined portion such that the metal layer may be deformed or peeled off when in use. In a rolling process, the stress is changed depending on the position and the time of the support layer 300 so the metal layer may be deformed or peeled off.

In an embodiment, as the metal layer 310 has an alternate shape including grooves GR, the stress is uniformly dispersed, and in the rolling process, the stress is constantly maintained in all directions, thereby minimizing the deformation.

Figure 12:
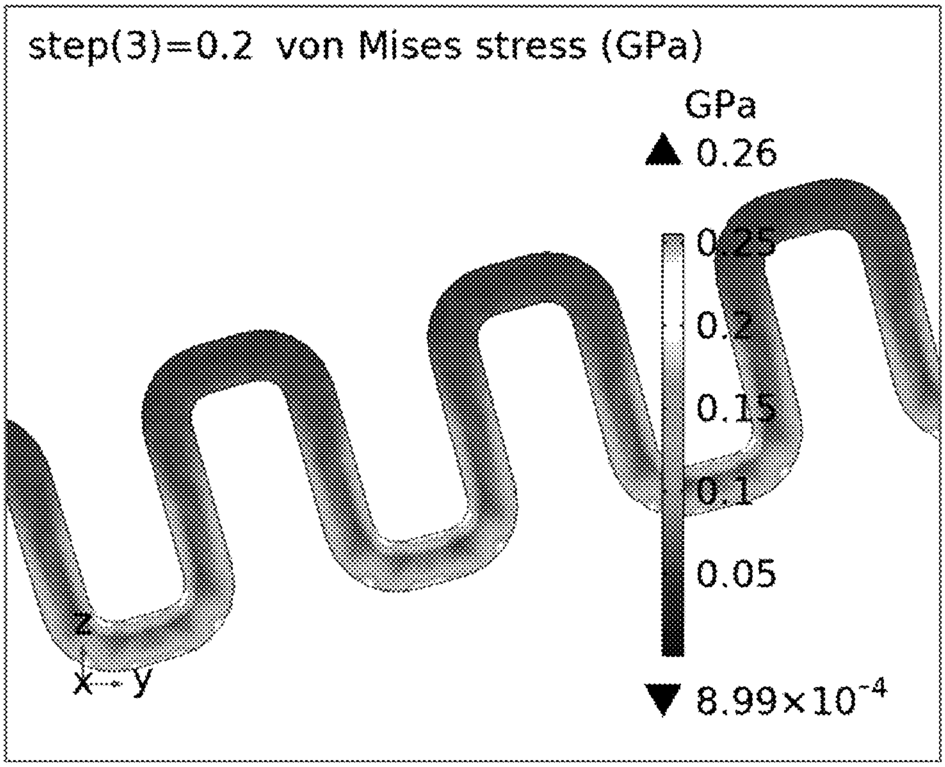
FIG. 12 shows a stress of a metal layer in a plane state according to the embodiment.

FIG. 12 shows a stress of a metal layer 310 in a plane state according to the embodiment. Referring to FIG. 12, it is found that the stress is uniformly applied as a whole and the stress is not lopsided.

Figure 13:
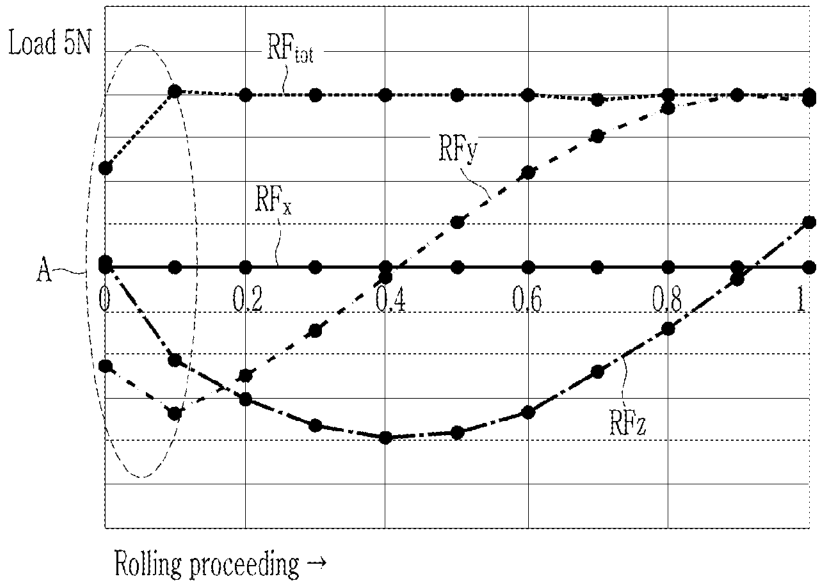
FIG. 13 shows stresses in respective directions when a display device of FIG. 12 is rolled.

FIG. 13 shows stresses in respective directions when a display device of FIG. 12 is rolled. The display device is rolled in an x-direction (i.e., the x-axis direction shown in FIG. 12), and here, the stress in the x-direction is marked as RFx, the stress in a y-direction (i.e., the y-axis direction shown in FIG. 12) is marked as RFy, the stress in a z-direction (i.e., the z-axis direction shown in FIG. 12) is marked as RFz, and the entire stress is marked as RFtot. Referring to FIG. 13, it is found that the stress at a first portion (A) where the rolling starts is somewhat non-uniform, and as the rolling proceeds, the general stress is constantly provided in a predetermined form. It is therefore found in an embodiment that the display device is deformed and peeled off on a minimum level in the rolling process.

Figure 14:
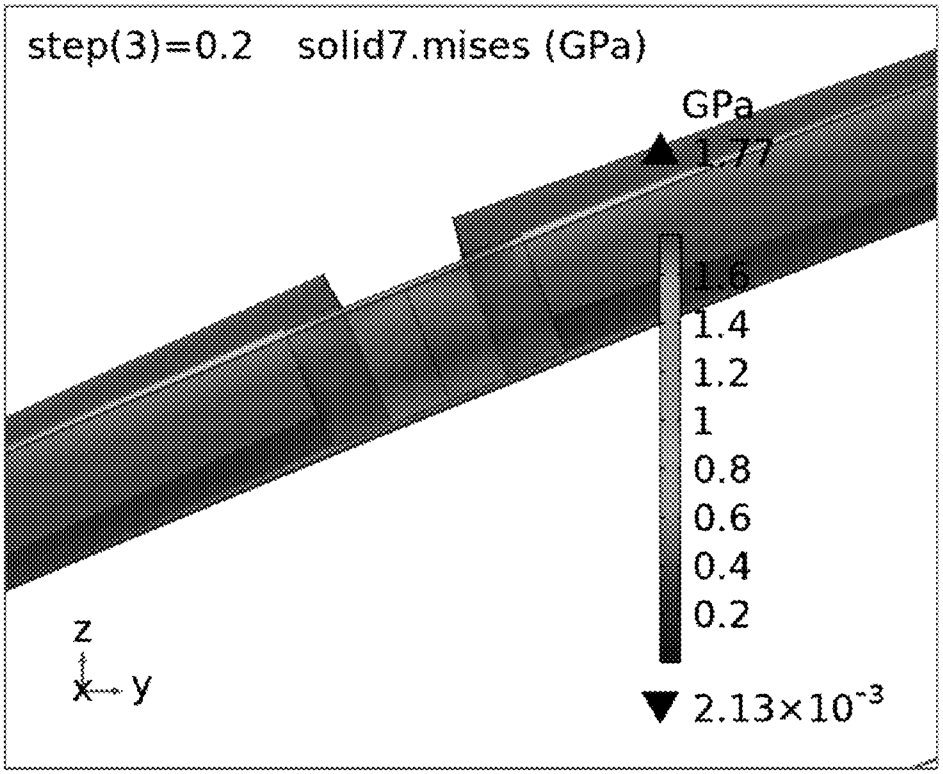
FIG. 14 shows stresses of a structure on which a metal layer is patterned in a flat-plate state.
Figure 15:
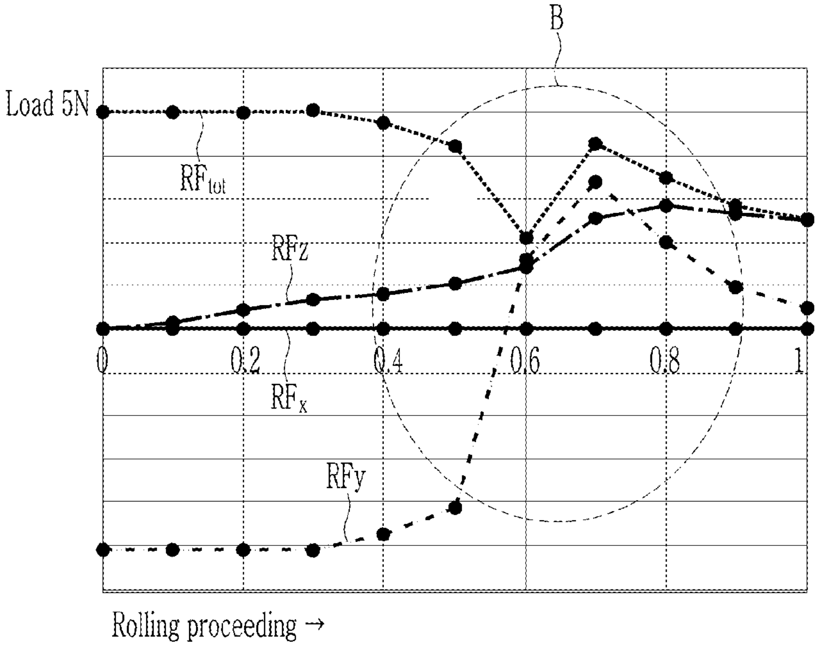
FIG. 15 shows stress in respective directions when a metal layer of FIG. 14 is rolled.

FIG. 14 shows stresses of a structure on which a metal layer is patterned in a flat-plate state. It is found in the case of FIG. 14 that the uniform stress is applied to the entire metal layer in the flat plate state before the rolling is performed. However, referring to FIG. 15, it is found that the stress is not uniform at the time of rolling. FIG. 15 shows stresses in respective directions when a metal layer of FIG. 14 is rolled. The display device is rolled in the x-direction, and the stress in the x-direction is marked as RFx, the stress in the y-direction is marked as RFy, the stress in the z-direction is marked as RFz, and the entire stress is marked as RFtot. Referring to FIG. 15, it is found that the patterned metal layer shown in FIG. 14 shows non-uniform stresses for the rolling process. That is, it is found that, when rolled in the x-direction, the stress at the first portion where the rolling starts is uniform, and as the rolling proceeds, the stresses in the respective directions are non-uniform.

That is, as described above with reference to FIGS. 13 and 15, it is found that the stress is uniformly maintained when the display device with a structure in which the metal layer 310 has grooves GR as in an embodiment is rolled.

Although the embodiment in which the support layer 300 has a structure shown in FIG. 5 has been described above, the shapes of the metal layer 310 and the elastic layer 320 in the support layer 300 may be variously modified.

Figure 16:
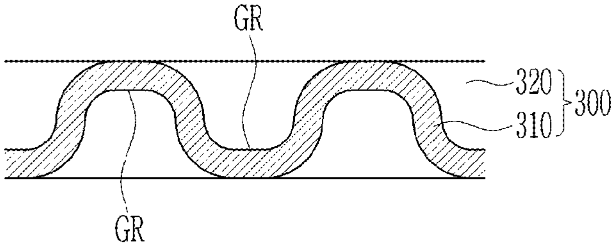
FIG. 16 shows a support layer according to an alternative embodiment.

FIG. 16 shows a support layer 300 according to an alternative embodiment. Referring to FIG. 16, in an embodiment of the support layer 300, the metal layer 310 may be formed in the entire region of the support layer 300, and the groove GR of the metal layer 310 may be filled with the elastic layer 320. In such an embodiment, as shown in FIG. 16, the metal layer 310 may be formed on the entire support layer 300, that is, the overall thickness of the metal layer 310 may be substantially the same as an overall thickness of the support layer 300. As shown in FIG. 16, part of the metal layer 310 may not be covered by the elastic layer 320.

Figure 17:
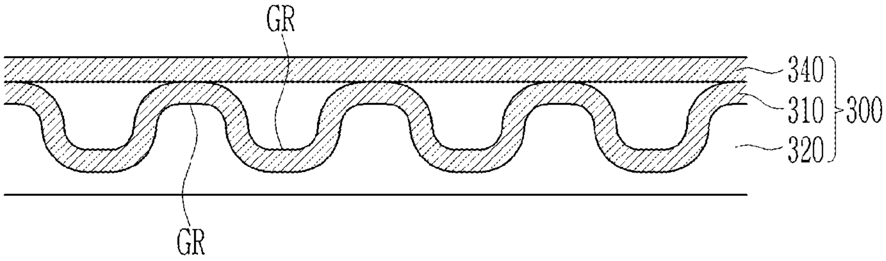
FIG. 17 shows a support layer according to another alternative embodiment.

FIG. 17 shows a support layer 300 according to another alternative embodiment. Referring to FIG. 17, an embodiment of the support layer 300 further includes a flat metal layer 340 positioned on the metal layer 310 in an alternate shape. The flat metal layer 340 may be positioned on one side of the metal layer 310, and an elastic layer 320 may be positioned between the metal layer 310 and the flat metal layer 340. In such an embodiment where the support layer 300 further includes the flat metal layer 340, the display panel 100 may be further efficiently supported. In an embodiment where the upper portion of the support layer 300 is the elastic layer 320, the upper portion of the support layer 300 may not be smooth but may be uneven, and in such an embodiment, displaying quality of the display panel 100 positioned on the upper portion may be deteriorated. However, in an embodiment where the flat metal layer 340 is positioned on the upper portion of the support layer 300 as shown in FIG. 17, the upper portion of the support layer 300 may be flattened, and the display panel 100 may be stably supported thereby.

The flat metal layer 340 may be positioned on one side of the support layer 300 and may not be positioned on another side thereof. It is desirable for the flat metal layer 340 to be positioned on the side where a compression is generated at the time of bending, and not be positioned on the side where an elongation is generated. If the flat metal layer 340 is positioned on the side where the elongation is generated, the elongation may not be easily generated.

Figure 18:
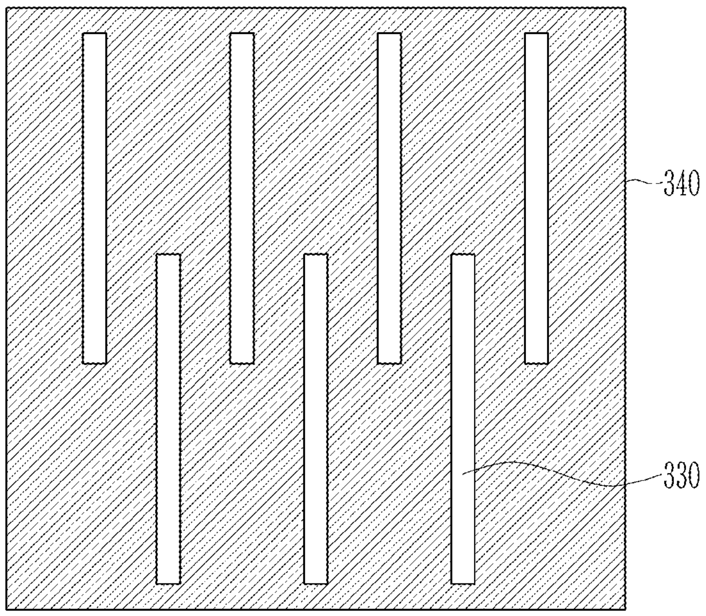
FIG. 18 shows a flat metal layer.

As shown in FIG. 18, in an embodiment, slits 330 are defined or formed in the flat metal layer 340. The slits 330 may be formed to be perpendicular to the direction in which the display device is rolled. Rolling or bending may be more easily performed by the slits formed in the flat metal layer 340.

Figure 19:
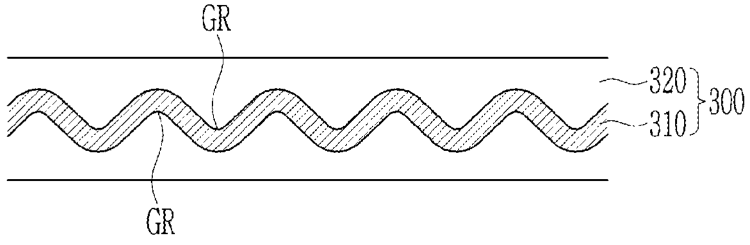
FIG. 19 to FIG. 30 show a support layer according to alternative embodiments.
Figure 20:
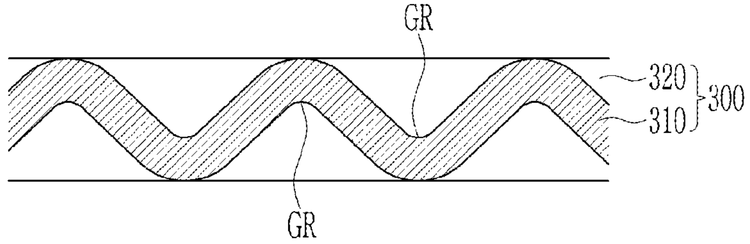
Figure 21:
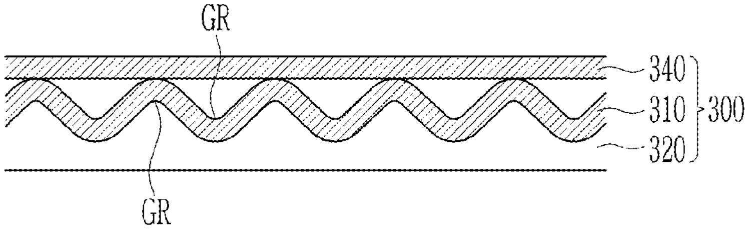

In an embodiment, the grooves GR has a quadrangle-like shape in a cross-section and the grooves GR are alternately formed, but the shape of the grooves GR of the metal layer 310 in a cross-section may be variable. FIG. 19 to FIG. 21 show an embodiment in which the grooves GR have a triangle-like shape in a cross-section. Referring to FIG. 19, in an embodiment of the support layer 300, the metal layer 310 has an alternate structure in which the grooves GR are alternately positioned on opposing sides, and the respective grooves GR have triangle-like shapes in a cross-section. The triangle-like shape represents a triangular shape including at least one curved corner. The stress may be concentrated on the corner if the groove GR has an angulated triangular form. Accordingly, in an embodiment, as shown in FIG. 19, the grooves GR may have a triangle-like shape with at least one curved corner. All the corners are shown to be curved in FIG. 19, and as described above with reference to FIG. 5, the stress may be dispersed when the outer corner of the groove GR giving an 5 influence on the dispersal of stresses is a curve.

An embodiment of the support layer 300 shown in FIG. 20 is substantially the same as the embodiment of the support layer 300 shown in FIG. 19 except that the metal layer 310 is positioned on the entire support layer 300. No repetitive detailed descriptions of the same constituent elements will be provided. In an embodiment of FIG. 20, part of the metal layer 310 may not be covered by the elastic layer 320. An embodiment of the support layer 300 shown in FIG. 21 is substantially the same as the embodiment of the support layer 300 shown in FIG. 19 except that the flat metal layer 340 is further positioned on the metal layer 310. In such an embodiment, as described above with reference to FIG. 18, slits 330 may be defined or formed in the flat metal layer 340. In an embodiment, as shown in FIG. 21, the flat metal layer 340 may be positioned on one side of the support layer 300 and may not be positioned on another side thereof.

Figure 22:
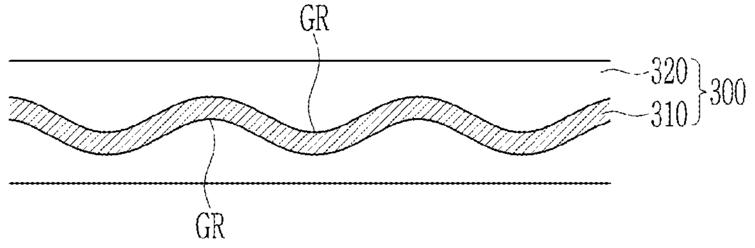
Figure 23:
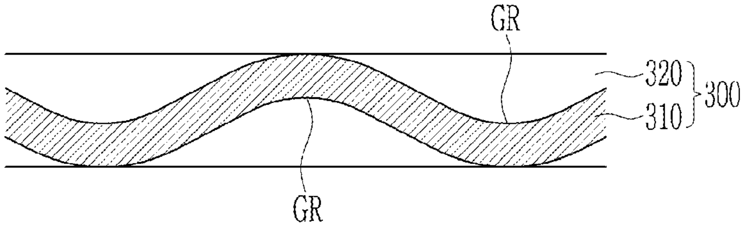
Figure 24:
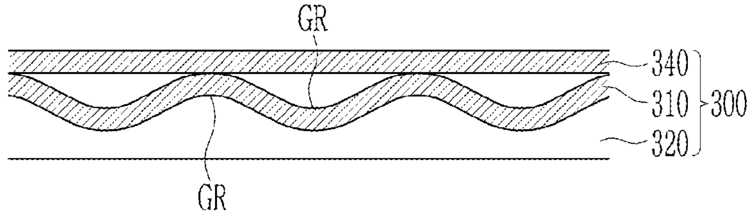

FIG. 22 to FIG. 24 show embodiments having a structure in which the grooves GR of the metal layer 310 are oval in a cross-section. Referring to FIG. 22, in an embodiment of the support layer 300, the metal layer 310 has an alternate structure in which the grooves GR are alternately positioned, and the shapes of the respective grooves GR may be oval. In an embodiment of FIG. 22, there is no angle in the groove GR so the concentration of the stress may be effectively prevented. In an embodiment, as shown in FIG. 22, the groove GR is more gently formed than the groove GR of FIG. 3 so the stress may be further uniformly dispersed than the embodiment of FIG. 5. Regarding FIG. 22 to FIG. 24, in an embodiment, the shape of the groove GR may be close to a semicircle.

An embodiment of the support layer 300 shown in FIG. 23 is substantially the same as the embodiment of the support layer 300 shown in FIG. 22 except that the metal layer 310 is positioned on the entire support layer 300. No repetitive detailed descriptions of the same constituent elements will be provided. An embodiment of the support layer 300 shown in FIG. 24 is substantially the same as the embodiment of the support layer 300 shown in FIG. 22 except that the flat metal layer 340 is further positioned on the metal layer 310. As described above with reference to FIG. 18, slits 330 may be defined or formed in the flat metal layer 340. As shown in FIG. 24, the flat metal layer 340 may be positioned on one side of the support layer 300 and may not be positioned on another side thereof.

Figure 25:
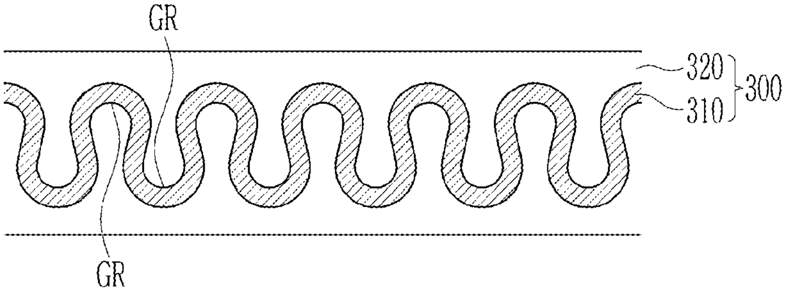
Figure 26:
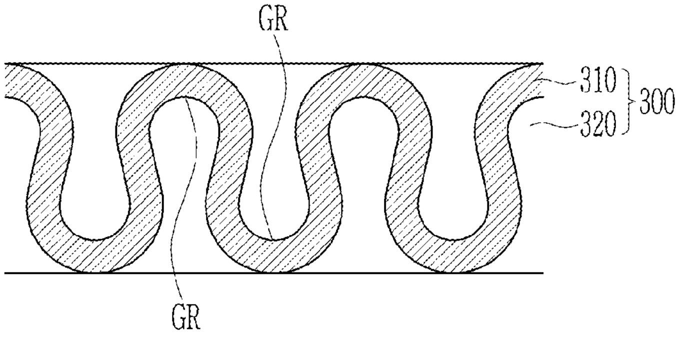
Figure 27:
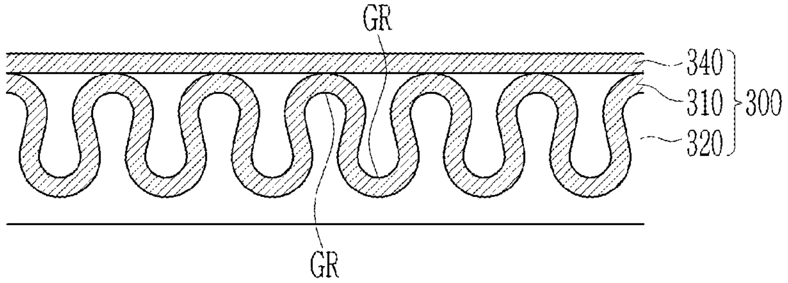

FIG. 25 to FIG. 27 show embodiments having a structure in which the grooves GR are circles with a lesser diameter than FIG. 22 to FIG. 24. Referring to FIG. 25, in an embodiment of the support layer 300, the metal layer 310 has an alternate structure in which the grooves GR are alternately positioned on respective sides, and the shapes of the respective grooves GR may be circles in a cross-section. Compared to FIG. 22, the grooves GR shown in FIG. 25 may have a circular shape with a lesser diameter, and in this case, the display device may be stably supported compared to the embodiment shown in FIG. 22. Referring to FIG. 25 to FIG. 27, the shapes of the grooves GR may be close to circular.

An embodiment of the support layer 300 shown in FIG. 26 is substantially the same as the embodiment of the support layer 300 shown in FIG. 25 except that the metal layer 310 is positioned on the entire support layer 300. No repetitive detailed descriptions of the same constituent elements will be provided. An embodiment of the support layer 300 shown in FIG. 27 is substantially the same as the embodiment of the support layer 300 shown in FIG. 26 except that the flat metal layer 340 is further positioned on the metal layer 310. As described above with reference to FIG. 18, slits 330 may be defined or formed in the flat metal layer 340. In such an embodiment, as shown in FIG. 27, the flat metal layer 340 may be positioned on one side of the support layer 300 and may not be positioned on another side thereof.

Figure 28:
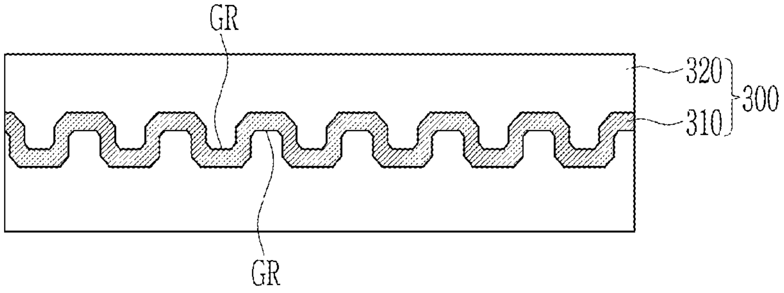
Figure 29:
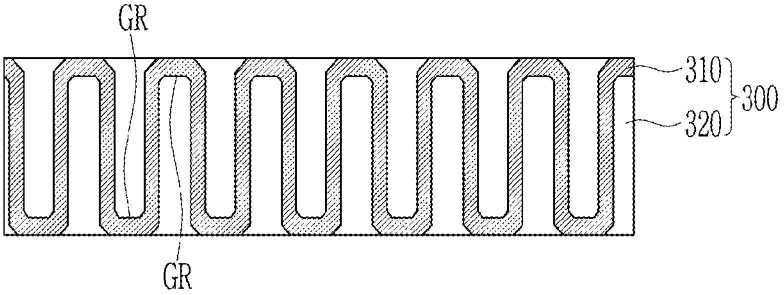
Figure 30:
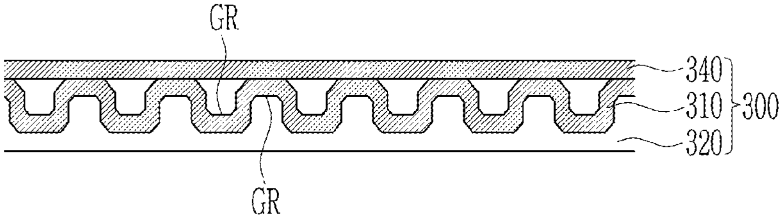

FIG. 28 to FIG. 30 show an embodiment in which the grooves GR of the metal layer 310 have shapes different from those described above. Referring to FIG. 28, in an embodiment of the support layer 300, the metal layer 310 may have an alternate structure in which the grooves GR are alternately positioned, and the respective grooves GR may have chamfered quadrangular shapes in a cross-section. In such an embodiment, as shown in FIG. 28, the shapes of the respective grooves GR may have a quadrangular shape from which the corners are removed. In such an embodiment, the quadrangular corners are removed so the concentration of the stress may be prevented.

An embodiment of the support layer 300 shown in FIG. 29 is substantially the same as the embodiment of the support layer 300 shown in FIG. 28 except that the metal layer 310 is positioned on the entire support layer 300. No repetitive detailed descriptions of the same constituent elements will be provided. An embodiment of the support layer 300 shown in FIG. 30 is substantially the same as embodiment of the support layer 300 shown in FIG. 28 except that the flat metal layer 340 is further positioned on the metal layer 310. As described above with reference to FIG. 18, slits 330 may be defined or formed in the flat metal layer 340. In such an embodiment, as shown in FIG. 30, the flat metal layer 340 may be positioned on one side of the support layer 300 and may not be positioned on another side thereof.

In embodiments of the display device according to the invention, the support layer 300 includes a metal layer 310 including grooves GR alternately positioned on respective sides and an elastic layer 320 for filling the grooves GR of the metal layer 310. The display device may have both high flexibility and high rigidity by the metal layer 310 in an alternate structure. In such embodiments, the stress is efficiently dispersed according to the shape of the metal layer 310 so the peeling off or deformation may be prevented at the time of a rolling, and the metal layer 310 has the alternate shape, the valid thickness giving an influence to the neutral plane of the display device is shown smaller than the actual thickness, so the movement of the neutral plane is minimized and the display device may be stably supported.

The invention should not be construed, as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel; and a support layer positioned on the display panel, wherein the support layer includes:

a metal layer positioned below the display panel; and an elastic layer positioned on opposing surfaces of the metal layer below the display panel, and the metal layer below the display panel has an undulated cross-sectional shape formed by repeated convex and concave grooves in an alternate structure such that the grooves are alternately defined on each of the opposing surfaces thereof, wherein the convex and concave grooves are formed in a single metal layer such that both opposing surfaces of the metal layer define the undulated cross-sectional shape, and wherein portions of the elastic layer are positioned within the grooves defined on both the opposing surfaces of the metal layer.

2. The display device of claim 1, wherein the metal layer includes at least one selected from aluminum, titanium, and stainless steel.

3. The display device of claim 1, wherein a thickness of the metal layer is in a range of about 0.5 mm to about 2 mm.

4. The display device of claim 1, wherein the elastic layer fills the grooves of the metal layer.

5. The display device of claim 1, wherein an elasticity coefficient of the elastic layer is in a range of about 1 KPa to about 10 GPa.

6. The display device of claim 1, wherein the elastic layer includes an elastomer.

7. The display device of claim 1, wherein a thickness of the support layer is in a range of about 10 m to about 10 mm.

8. The display device of claim 1, wherein a width of each of the grooves is one to ten times a thickness of the metal layer.

9. The display device of claim 1, wherein a height of each of the groove is one to ten times a thickness of the metal layer.

10. The display device of claim 1, wherein a predetermined region of the metal layer is not covered by the elastic layer.

11. The display device of claim 1, wherein the support layer further includes a flat metal layer positioned between the metal layer and the display panel.

12. The display device of claim 11, wherein slits are defined in the flat metal layer in one direction.

13. The display device of claim 1, wherein the display device is rollable.

14. The display device of claim 13, wherein a proceeding direction of each of the grooves is perpendicular to a rolling direction of the display device.

15. The display device of claim 13, wherein the grooves are alternately positioned on the opposing surfaces of the metal layer in a rolling direction of the display device.

16. The display device of claim 1, wherein the groove has a quadrangular shape with a curved corner in a cross-section.

17. The display device of claim 1, wherein the groove has a triangular shape with a curved corner in a cross-section.

18. The display device of claim 1, wherein
the groove has an oval shape in a cross-section.

19. The display device of claim 1, wherein
the groove has a circular shape in a cross-section.

20. The display device of claim 1, wherein
a valid thickness of the metal layer for a neutral plane is equal to or less than about 10% of an actual thickness of the metal layer.

21. The display device of claim 1, wherein
a neutral plane of the display device is positioned in the display panel.

* * * * *